United States Patent

Totsuka et al.

(10) Patent No.: US 6,304,672 B1
(45) Date of Patent: *Oct. 16, 2001

(54) EDGE DETECTING METHOD AND EDGE DETECTING DEVICE WHICH DETECTS EDGES FOR EACH INDIVIDUAL PRIMARY COLOR AND EMPLOYS INDIVIDUAL COLOR WEIGHTING COEFFICIENTS

(75) Inventors: Takashi Totsuka, Chiba; Tomoo Mitsunaga, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/292,281

(22) Filed: Apr. 15, 1999

Related U.S. Application Data (63) Continuation of application No. 08/963,061, filed on Oct. 30, 1997, which is a continuation of application No. 08/518,233, filed on Aug. 23, 1995, now abandoned.

(30) Foreign Application Priority Data

Sep. 2, 1994 (JP) .................................... 6-234201

(51) Int. Cl.[7] .................................................. G06K 9/48
(52) U.S. Cl. ............................................................. 382/199
(58) Field of Search ...................................... 382/199, 200, 382/201, 202, 203, 204, 162, 266

(56) References Cited

U.S. PATENT DOCUMENTS

| | | | |
|---|---|---|---|
| 5,038,223 | * 8/1991 | Yamada | 358/445 |
| 5,267,031 | 11/1993 | Katoh et al. | 358/527 |
| 5,341,142 | * 8/1994 | Reis et al. | 342/64 |
| 5,574,800 | 11/1996 | Inoue et al. | 382/199 |
| 5,602,942 | 2/1997 | Takemoto et al. | 382/266 |
| 5,708,632 | 1/1998 | Totsuka et al. | 369/32 |
| 5,887,082 | * 3/1999 | Mitsunaga et al. | 382/199 |
| 5,892,853 | * 4/1999 | Hirani et al. | 382/280 |

* cited by examiner

*Primary Examiner*—Andrew W. Johns
*Assistant Examiner*—Seyed Azarian
(74) *Attorney, Agent, or Firm*—Bell, Boyd & Lloyd LLC (57) ABSTRACT

An edge detecting method and an edge detecting device improve the accuracy in edge detection and extract the outline correctly even in the general image. In the case of detecting the picture element group which is changing rapidly as compared with its surroundings as the edge from within image data in which each picture element is composed of independent N numbers of dark and light data R, G, and B respectively, N sets of coefficients Wr, Wg, Wb corresponding to N numbers of dark and light data It, G, B respectively are calculated, and each picture element is judged whether it is edge or not depending upon N numbers of (lark and light data R, G, B and N sets of coefficients Wr, Wg, Wb.

26 Claims, 8 Drawing Sheets

COLOR IMAGE

FIG. 1A
(RELATED ART)

FRONT VIEW PART

FIG. 1B
(RELATED ART)

BACKGROUND PART

RED DARK & LIGHT IMAGE

FIG. 2B
(RELATED ART)

GREEN DARK & LIGHT IMAGE

FIG. 2C
(RELATED ART)

BLUE DARK & LIGHT IMAGE

EDGE OF RED

**FIG. 3A
(RELATED ART)**

EDGE OF GREEN

**FIG. 3B
(RELATED ART)**

EDGE OF BLUE

**FIG. 3C
(RELATED ART)**

COMBINED EDGE

INNER PRODUCT VALUE

FIG. 6A

EDGE

FIG. 6B

| -1 | 0 | 1 |
|---|---|---|
| -2 | 0 | 2 |
| -1 | 0 | 1 |

| 1 | 2 | 1 |
|---|---|---|
| 0 | 0 | 0 |
| -1 | -2 | -1 |

EDGE DETECTING METHOD AND EDGE DETECTING DEVICE WHICH DETECTS EDGES FOR EACH INDIVIDUAL PRIMARY COLOR AND EMPLOYS INDIVIDUAL COLOR WEIGHTING COEFFICIENTS

This is a continuation of application No. 08/963,061, filed Oct. 30, 1997, which is a continuation of application Ser. No. 08/518,233 filed Aug. 23, 1995, abandoned.

BACKGROUND OF THE INVENTION

1. Field of the Invention

The present invention relates to an edge detecting method and an edge detecting device and conducts the edge detecting processing which plays a basic role especially on the image processing, and can be suitably applied to such as the special effect processing in the video production of television and motion pictures and the element recognition processing from the camera image in the FA (factory automation).

Description of the Related Art

Heretofore, the edge detection has been a process to find the part where the picture element value is rapidly changing between dark and light images. And since normally sudden changes occur on the outline of the object, the contour of the object can be extracted from the pictorial image depending on the result of edge detection. Therefore, the edge detection has been widely utilized as the most basic processing for obtaining information from the image on the object existing in that image.

In the color images, since dark and light image exist in every primary color (e.g., red, green, and blue), heretofore the edge detection has been conducted on each primary color and if the edge is detected on any color, that picture element is regarded as an edge of the color image. This will be explained referring to the image shown in FIG. 1A. This image is a round object shown in FIG. 1B which is placed in front of the background having a horizontal line shown in FIG. 1C.

Figure 2A:
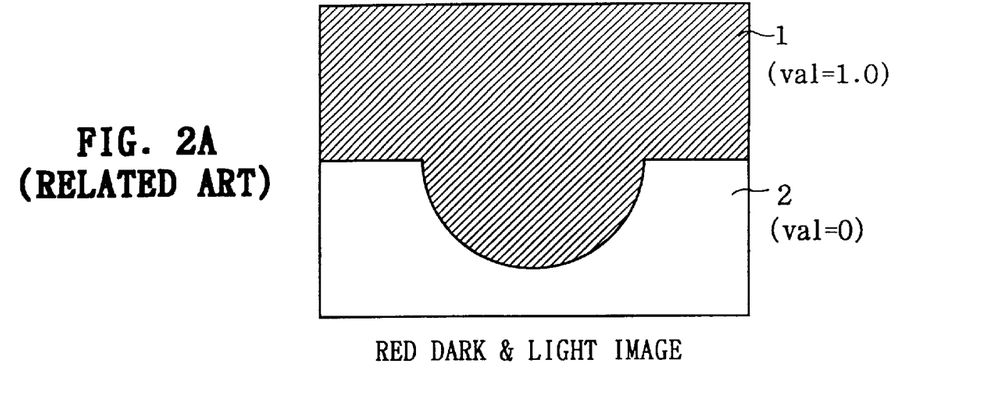
FIGS. 2A to 2C are brief linear diagrams showing the color image of FIGS. 1A to 1C upon decomposing into dark and light image of each primary color.
Figure 2B:
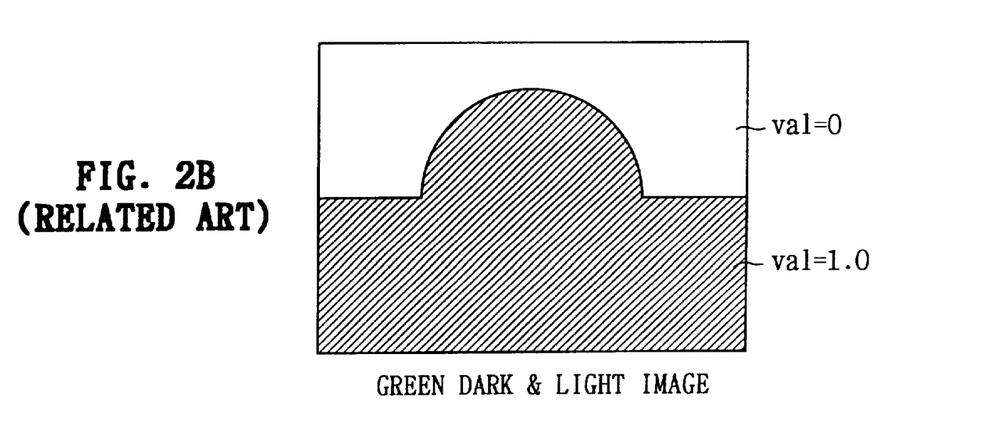
Figure 2C:
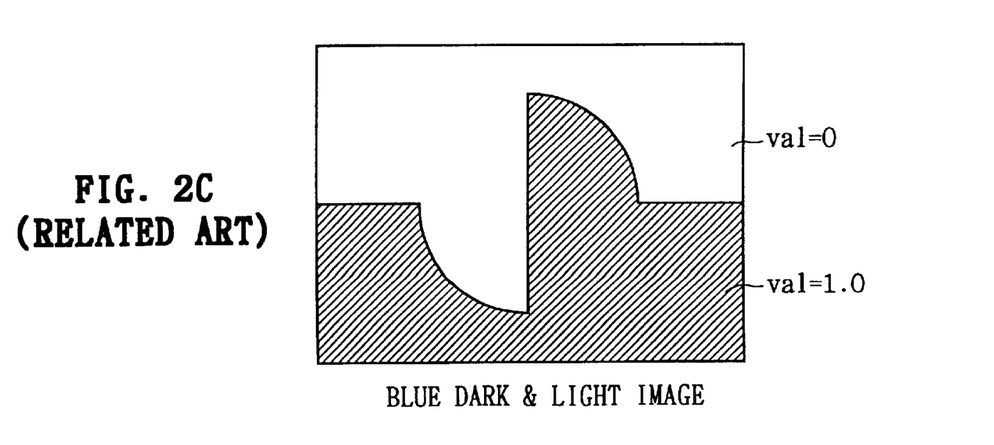
Figure 3A:
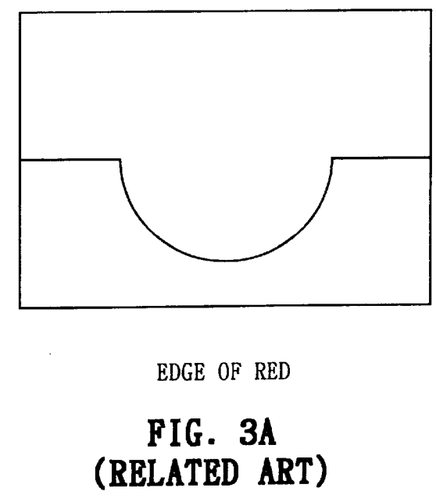
FIGS. 3A to 3D are brief linear diagrams showing an output of which each dark and light image is independently edge detected and its combined output.

In the case of this image, the dark and light image of three primary colors, red, green, and blue become like FIGS. 2A, 2B, and 2C respectively. For example, in the case of red, the picture element value of the inside of area 1 shown by oblique lines is "1.0" and the picture element value of the inside of the remaining area 2 is "0". The same will be applied to green and blue. If the edge is detected on each dark and light image, since the edge on the part where the sudden change occurs, i.e., only the place where the picture element value changes from "1.0" to "0" can be obtained as the edge, edges like FIGS. 3A, 3B, and 3C corresponding to FIGS. 2A, 2B, and 2C will be obtained. If the edge is detected in any one of the colors, red, green, or blue, its picture element is considered as an edge, and the edge which can be ultimately obtained will be like FIG. 3D by combining these edges.

Figure 3B:
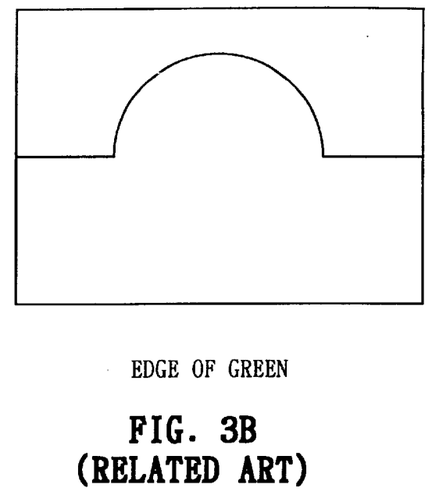
Figure 3C:
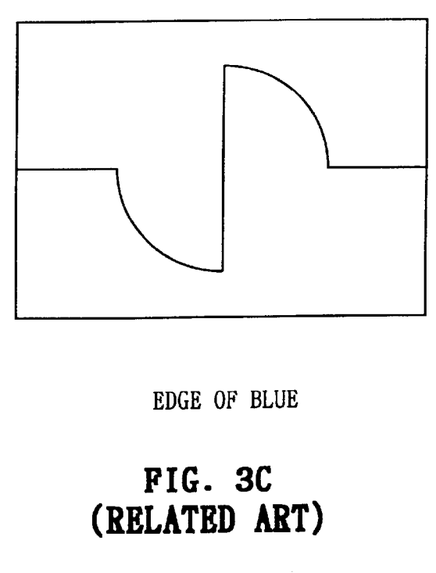
Figure 3D:
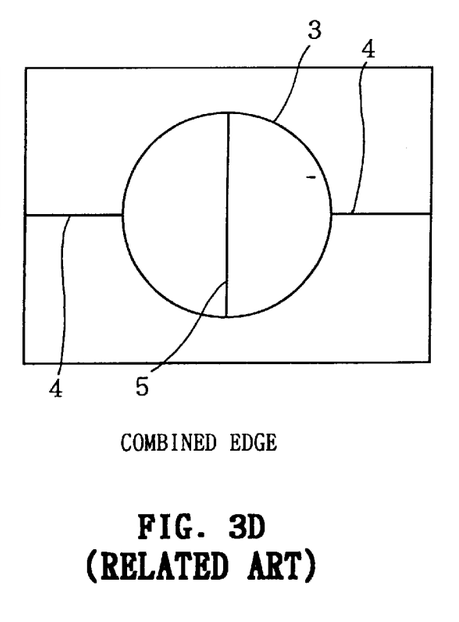

However, since the edge obtained as described above contains a horizontal line 4 in the background and a vertical line 5 of the inside of a circle besides a contour 3 of the circle to be aimed originally, recognition of the real contour by means of the computer becomes very difficult. Like this example, the problem that unnecessary parts are detected as edges occurs in the case where there are patterns or colors and changes in lightness exist in the object and background.

Since it is common that there exist patterns and colors and changes in lightness on the object to be aimed for extraction from the image background or from within an image, it is practically impossible to extract the contour from the optional image by means of the conventional device, and in practice the contour extraction by the computer has been conducted only under limited condition, such as in the case where the background is painted with a uniform color.

Various improvements have heretofore been developed to alleviate these problems based on experience. For example, when the edge was detected in either primary color, that picture element was not only regarded as an edge but the method has been modified taking great account of lightness changes. However, since the application of dark and light image of each primary color is fixed in advance, these cannot be applied to images which did not follow the law of experience, and they were insufficient for practical use as the edge detection accuracy.

SUMMARY OF THE INVENTION

In view of the foregoing, an object of the present invention is to provide an edge detecting method and edge detecting device capable of improving the accuracy of edge detection and extracting the contour correctly in the general image.

The foregoing object and other objects of this invention have been achieved by the provision of an edge detecting method for detecting a picture element group changing rapidly as compared with its surroundings as an edge $E(x,y)$ from within image data in which each picture element is composed of N numbers of independent dark and light data $R(x,y)$, $G(x,y)$, $B(x,y)$ respectively. This is accomplished by a method comprising a coefficient calculating step SP1 for calculating N sets of coefficients $Wr(x,y)$, $Wg(x,y)$, $Wb(x,y)$ corresponding to N numbers of dark and light data $R(x,y)$, $G(x,y)$, $B(x,y)$ respectively, and judging steps SP2, SP3, SP4 for judging whether each picture element is the edge $E(x,y)$ or not based on N numbers of dark and light data $R(x,y)$, $G(x,y)$, $B(x,y)$ and N sets of coefficients $Wr(x,y)$, $Wg(x,y)$, $Wb(x,y)$.

Furthermore, according to the present invention, an edge detecting device 10 for detecting a picture element group changing rapidly as compared with its surroundings from within image data in which each picture element is composed of N numbers of independent dark and light data 11, 12, 13 respectively is comprised of a coefficient calculating means 14 for calculating N sets of coefficients Wr, Wg, Wb corresponding to N numbers of dark and light data 11, 12, 13 respectively, and a judging means 16 for judging whether each picture element is the edge or not based on N numbers of dark and light data 11, 12, 13 and N sets of coefficients Wr, Wg, Wb.

In the case of detecting the group of picture elements which is changing rapidly as compared with its surroundings as the edge $E(x,y)$ from within image data in which picture elements is composed of N numbers of independent dark and light data $R(x,y)$, $G(x,y)$, $B(x,y)$, since N sets of coefficients $Wr(x,y)$, $Wg(x,y)$, $Wb(x,y)$ corresponding to N numbers of dark and light data $R(x,y)$, $G(x,y)$, $B(x,y)$ respectively will be calculated and each picture element will be judged as to whether it is the edge or not based on N numbers of dark and light data $R(x,y)$, $G(x,y)$, $B(x,y)$ and N sets of coefficients $Wr(x,y)$, $Wg(x,y)$, $Wb(x,y)$, the edge detection accuracy can be improved and the contour can be correctly extracted even in the general image.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 4:
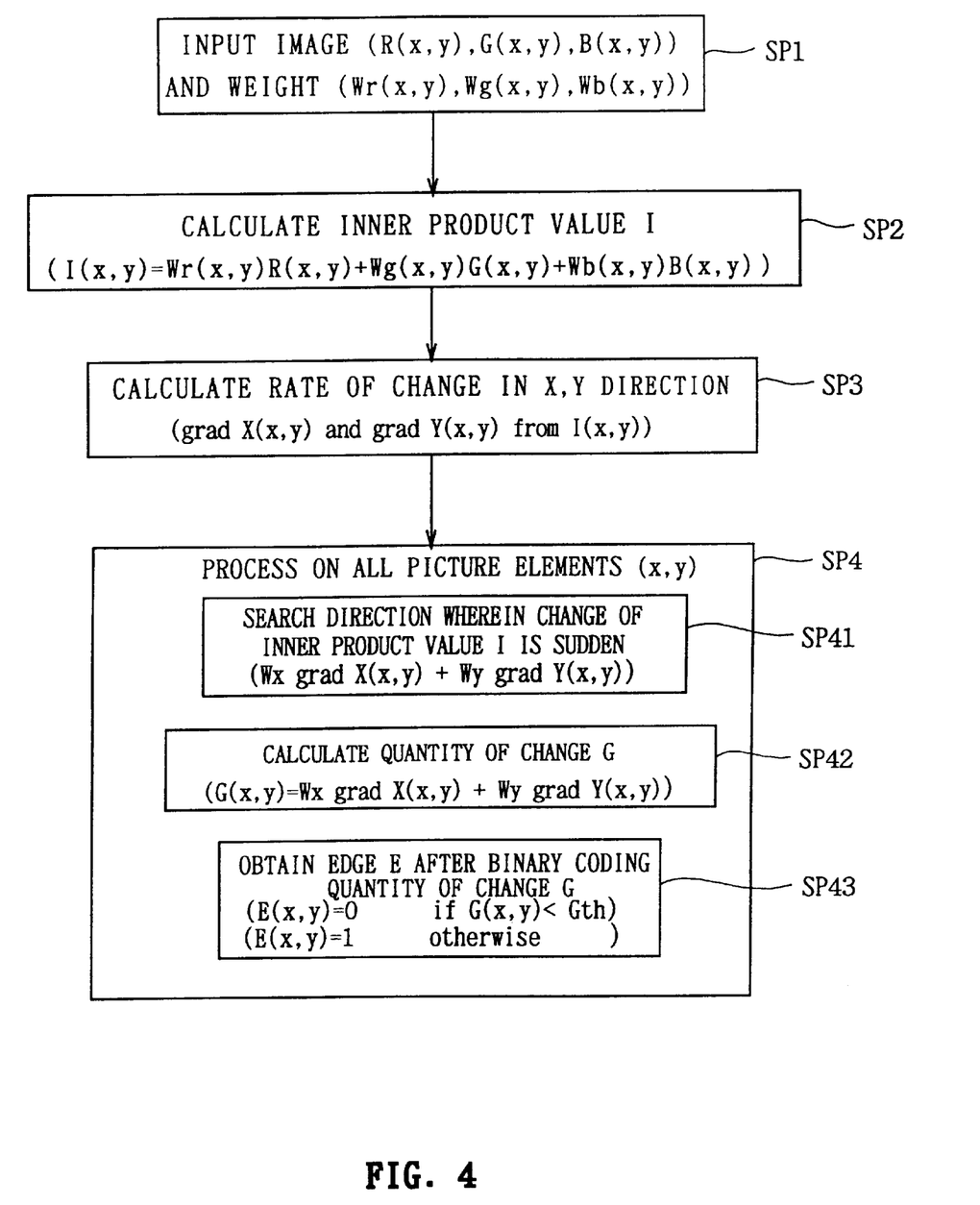
FIG. 4 is a flow chart showing an edge detection processing procedure in one embodiment of the edge detecting method according to the present invention.

Preferred embodiments of the present invention will be described with reference to the accompanying drawings:
(1) The First Embodiment FIG. 4 shows an edge detecting processing procedure to be conducted by the computer of the image processing device applied to the edge detecting method according to the present invention. At the step SPI of this edge detecting processing procedure, the color image data which will be the object of processing and the most suitable weight coefficient for the edge detection will be inputted. The color image data is made up of three primary colors, dark and a light image of red, green, and blue, respectively $R(x,y)$, $G(x,y)$, $B(x,y)$ will be inputted. Also, weight coefficients on red, green, and blue will be $Wr(x,y)$, $Wg(x,y)$, $Wb(x,y)$ respectively. Since values of these weight coefficients differ in each pixel of the image, i.e., each x, y, the optimal parameter for edge detection can be determined in every small part in the image at that place.

For example, in the case where it is known that an upper half of the screen is trees and a lower half is the surface of the water of a lake, the most suitable weight coefficient for green color may be given in the upper part of the screen and the most suitable weight coefficient for blue line color may be given at the lower part. These characteristics of image can be obtained generally as the condition at the time of photographing. Also, the user can give them to the computer afterwards. The, computer calculates an appropriate coefficient depending upon the characteristic of the image given. This becomes the input of the step SP1. The coefficient determination of the image shown in FIGS. 1A to 1C will be described in detail below. If the whole screen can give the equal weight coefficient, the fixed number WR may be given in place of the weight coefficient $Wr(x,y)$ (also the other primary colors) and in that case, the storage for the weight coefficient can be reduced.

Furthermore, at the step SP2, the inner product at each picture element will be calculated based on dark and light image of three primary colors $R(x,y)$, $G(x,y)$, and $B(x,y)$ and weight coefficients $Wr(x,y)$, $Wg(x,y)$, $Wb(x,y)$ from the following equation:

$$I(x,y)=Wr(x,y)R(x,y)+Wg(x,y)G(x,y)+Wb(x,y)B(x,y) \quad (1)$$

Here, $I(x,y)$ is the inner product value. The previous color image was three dimensional data having three values in each picture element. However, this step SP2 converts this to the one dimensional inner product value $I(x,y)$. According to the calculation of this step SP2, the edge detection sensitive only to the contour is possible and its effect will be described later referring to examples. And since the output of the step SP2 has one value on each picture element, this can be regarded as the normal dark and light image.

The step SP3 and step SP4 are steps for detecting the edge considering the inner product value $I(x,y)$ as dark and light image. The step SP3 is the processing for calculating the rate of change in x direction and y direction of the inner product value $I(x,y)$. The step SP41 is the processing to search the direction where the change of the inner product value $I(x,y)$ is most rapid, the step SP42 is the processing to obtain the quantity of change $G(x,y)$ in that direction, and the step SP43 is the processing for binary coding the quantity of change $G(x,y)$ obtained in utilizing the prefixed threshold value Gth. The result of binary coding is obtained as the edge image $E(x,y)$.

This series of processings is based upon the well known edge detection algorithm of the Canny. System for an edge detection method for dark and light image in which the value of each picture element is one dimensional, and there are many other known methods. These methods are introduced in detail, such as in the typical textbook written by Jain "Fundamentals of Digital Image Processing". And these methods can be used in this embodiment at steps SP3 and SP4.

Figure 5:
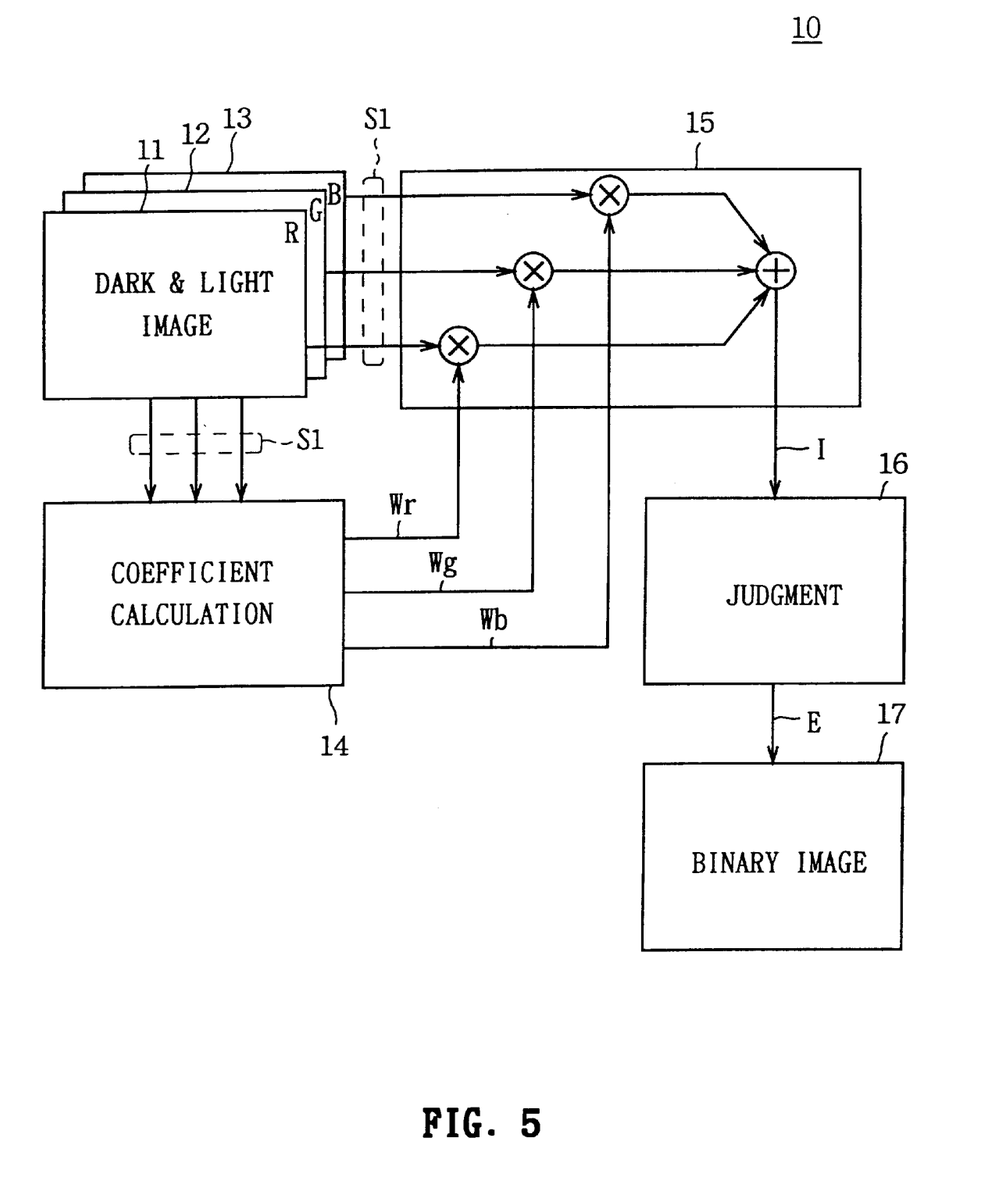
FIG. 5 is a block diagram showing the construction of the first embodiment of the edge detecting device according to the present invention.

Furthermore, FIG. 5 shows one embodiment of the edge detecting device according to the present invention. The image data that will be the object for processing is held as dark and light images 11 (R), 12 (G), 13 (B) of each primary color red, green, and blue. The coefficient calculating unit 14 obtains the most suitable coefficient to detect the edge from the image data, and outputs them as coefficients Wr, Wg, Wb relating to red, green, blue respectively. The inner product calculating unit 15 obtains products of red part and coefficient Wr, green part and coefficient Wg, and blue part and coefficient Wb in the picture element value S1 respectively and by adding these, calculates the inner product value I. This is equivalent to the calculation of step SP2 of the edge detection processing procedure of FIG. 4.

The resulting inner product value I is inputted to the judging unit 16 and judged whether each picture element is the edge or not. This judging unit 16 conducts the processing of steps SP3 and SP4 of the edge detection processing procedure of FIG. 4. As a result, concerning each picture element, the judging unit 16 outputs "1" if it is the edge, and if it is not, outputs the judgment signal E to become "0". And if these are stored in the arrangement of the same size as the former image, the result of edge detection is obtained as a binary image 17 so that only the edge is "1".

Figure 1A:
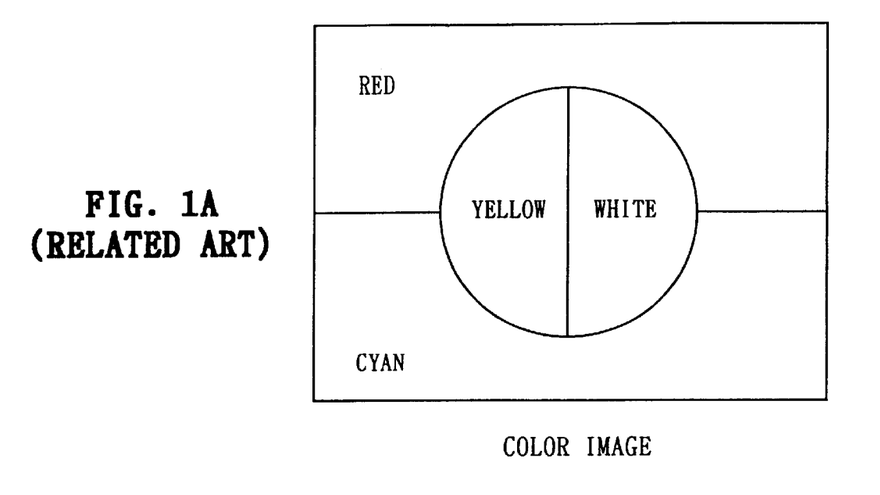
FIGS. 1A to 1C are brief linear diagrams showing the color image to be used for explanation of edge detection.
Figure 1B:
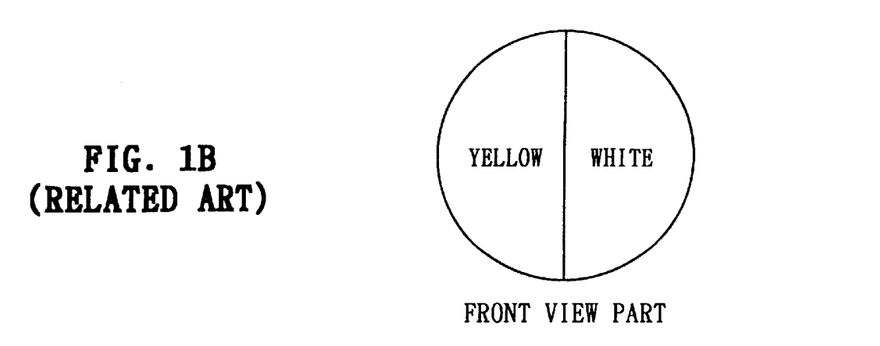
Figure 1C:
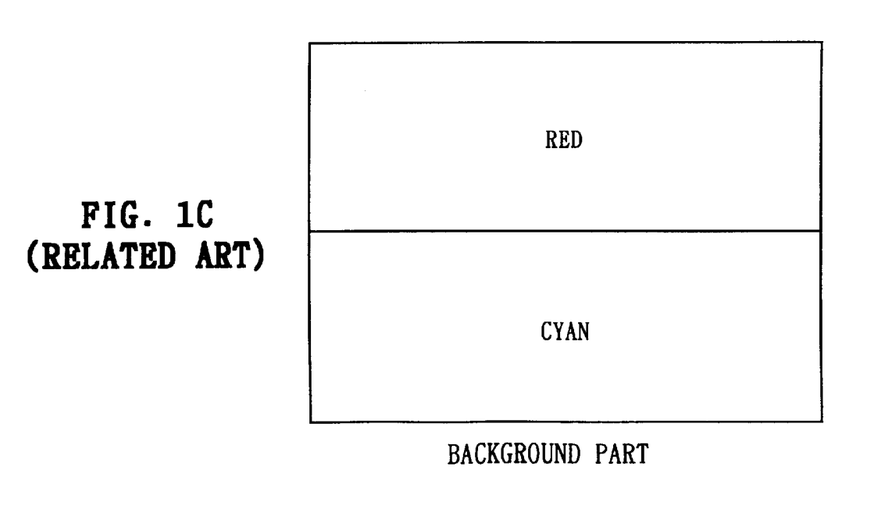

At this point, according to the present invention, as an effect of the inner product calculation using the weight coefficient, if the image data of FIG. 1A is inputted, dark and light images 11, 12, 13 of FIG. 5 become FIG. 2A, 2B, 2C respectively. At this point, if the coefficient calculating unit 14 calculates coefficients as Wr=1.0, Wg=1.0, Wb=0.0 using the method to be described later, the output E of the inner product calculating unit 15 become as shown in FIG. 6A.

Figure 6A:
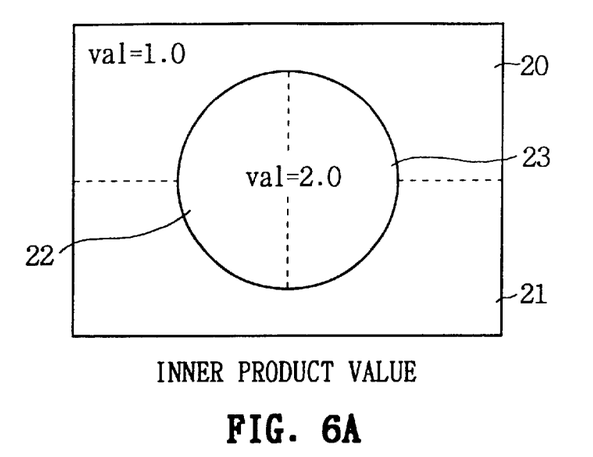
FIGS. 6A and 6B are brief linear diagrams explaining the edge detecting operation of color image of FIGS. 1A to 1C according to the edge detecting method of the present invention.

More specifically, since in an area 20 of FIG. 6A, only red picture element value is "1.0" and green and blue picture element values are "0", the inner product value I to be obtained by the equation (1) is "1". Moreover, since in an area 23 all picture element values are "1.0" but Cb=0, the inner product value become "2.0" by the equation (1). If the similar calculation is conducted on the remaining areas 21, 22, it is apparent that the inner product value of the inside of the circular object is "2.0" as shown in FIG. 6A and the inner product value in the background is "1.0".

Figure 6B:
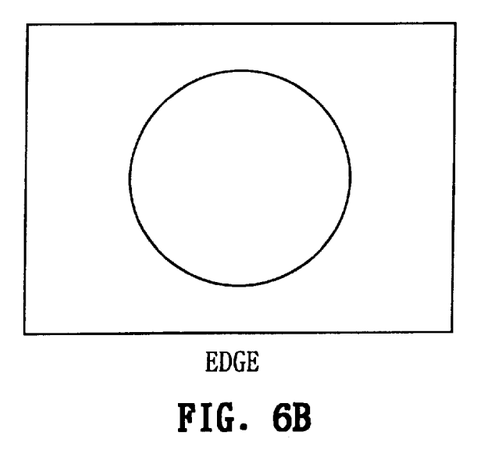

More specifically, the inner product value I does not change either inside of the round object or inside of the background but changes only at the border of the round object and background. Thus, if the changing part of inner product value I is detected, the outline of the object aimed can be easily edge detected as shown in FIG. 6B. Extra edges as shown in FIG. 3B which could not be avoided by the conventional method do not occur. Accordingly, in the edge detecting device 10 of this embodiment, an appropriate edge detection can be conducted not depending An the pictorial image because the coefficient calculating unit 14 obtains appropriate coefficients Wr, Wg, Wb corresponding to the image data.

Figure 7A:
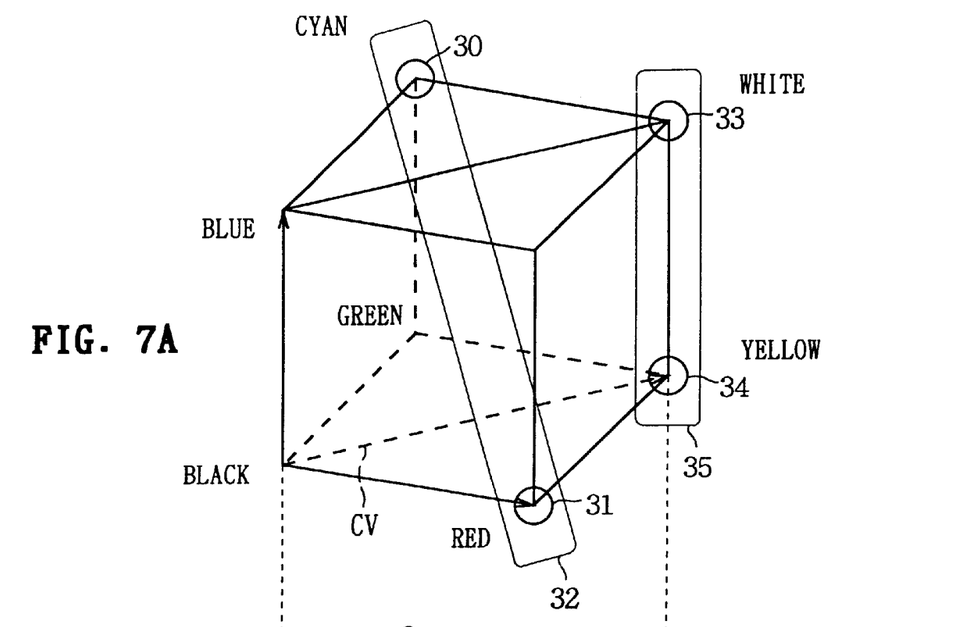
FIGS. 7A to 7C are brief linear diagrams explaining the fundamentals of coefficient calculating method of the present invention.

The computing method of coefficients Wr, Wg, Wb in the coefficient calculating unit 14 will be shown below. FIG. 7A shows the distribution of image data of FIG. 1A in a coordinate system with the three primary colors as the coordinate axes (hereinafter referred to as color space). The point 30 shows the part of cyan color in the background and the point 31 shows the red part in the background. More specifically, colors forming the background exist inside of an area 32 in the color space. Similarly, the white part of the round object corresponds to the point 33 and the yellow part corresponds to the point 34 respectively, and as a whole, colors in the round object exist inside of an area 35 in the color space. If a vector CV perpendicularly intersecting these two areas is obtained in the color space and makes the vector CV factor as the output of the coefficient calculating unit 14, highly accurate edge detection can be conducted.

Figure 7B:
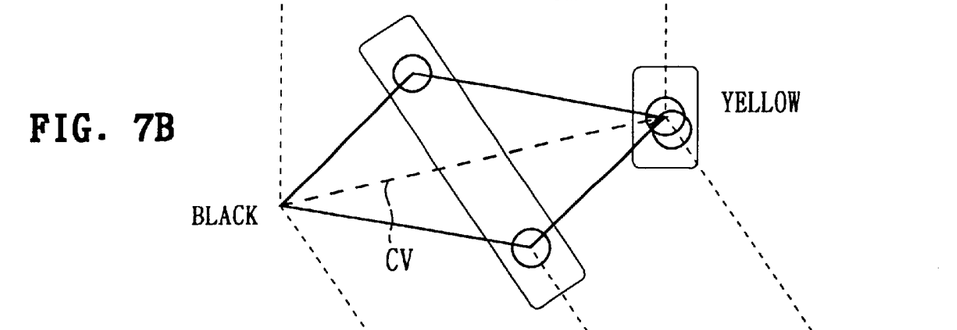
Figure 7C:
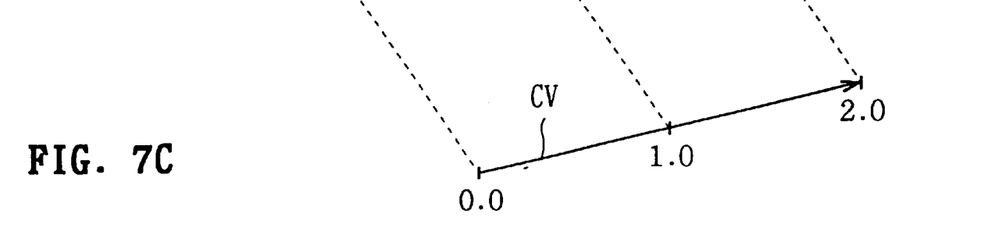

According to this embodiment, since the vector CV which is (red, green, blue)=(1, 1, 0) intersects the area 32 and area 35 at right angles, it is alright to if let (Wr, Wg, Wb)=(1, 1, 0). The inner product computation at the inner product computing unit 15 based on coefficients Wr, Wg, and Wb thus obtained allows obtaining the size of element along the vector CV within colors. In FIG. 7, the inner product of the vector CV and color is equal to that of projecting a solid object in the direction of the blue axis of (FIG. 7B) and to observe this from the side along the vector CV and measure the distance from the original point (FIG. 7C.

As it is clear from FIG. 7C, colors existing in the area 32 in the former color space are all projected to the point of the inner product value "1.0" and on the other hand, colors in the area 35 are all projected to the point of the inner product value "2.0". More specifically, the inner product value of vector CV and color reacts only to the color change between the background and the object regardless of color change in the background area and color change of the inside of the round object. Thus, it is apparent that utilizing this inner product value the object can be separated accurately from the background.

There are cases where no vector which intersects completely both the background area and the object area at right angles exists in some image data. However, an efficient edge detection having less noise as compared with the conventional method is possible if it is so arranged that the vector intersects these areas at right angles and the inner product value of the background and the object area is different and is selected to make the coefficient as an output of the coefficient calculating unit 14.

According to the foregoing construction, in the case of detecting the picture element group which is rapidly changing as compared with the surroundings from within the image data in which the picture elements are composed of dark and light images R, G, B of three primary colors respectively as edges, since coefficients Wr, Wg, Wb for 3 primary colors corresponding to each of dark and light images of 3 primary colors are computed and each picture element is judged whether it is the edge or not based on dark and light images of 3 primary colors R, G, B and coefficients Wr, Wg, Wb, the accuracy in edge detection can be improved and contours can be correctly extracted in the general image. Furthermore, according to the foregoing construction, although dark and light images R, G. B exist as 3 numbers, the edge detection may be conducted only on the inner product value I and thus, only one judging unit 16 is necessary and the quantity of hardware can be reduced as compared with the past.

(2) The Second Embodiment

Figure 8:
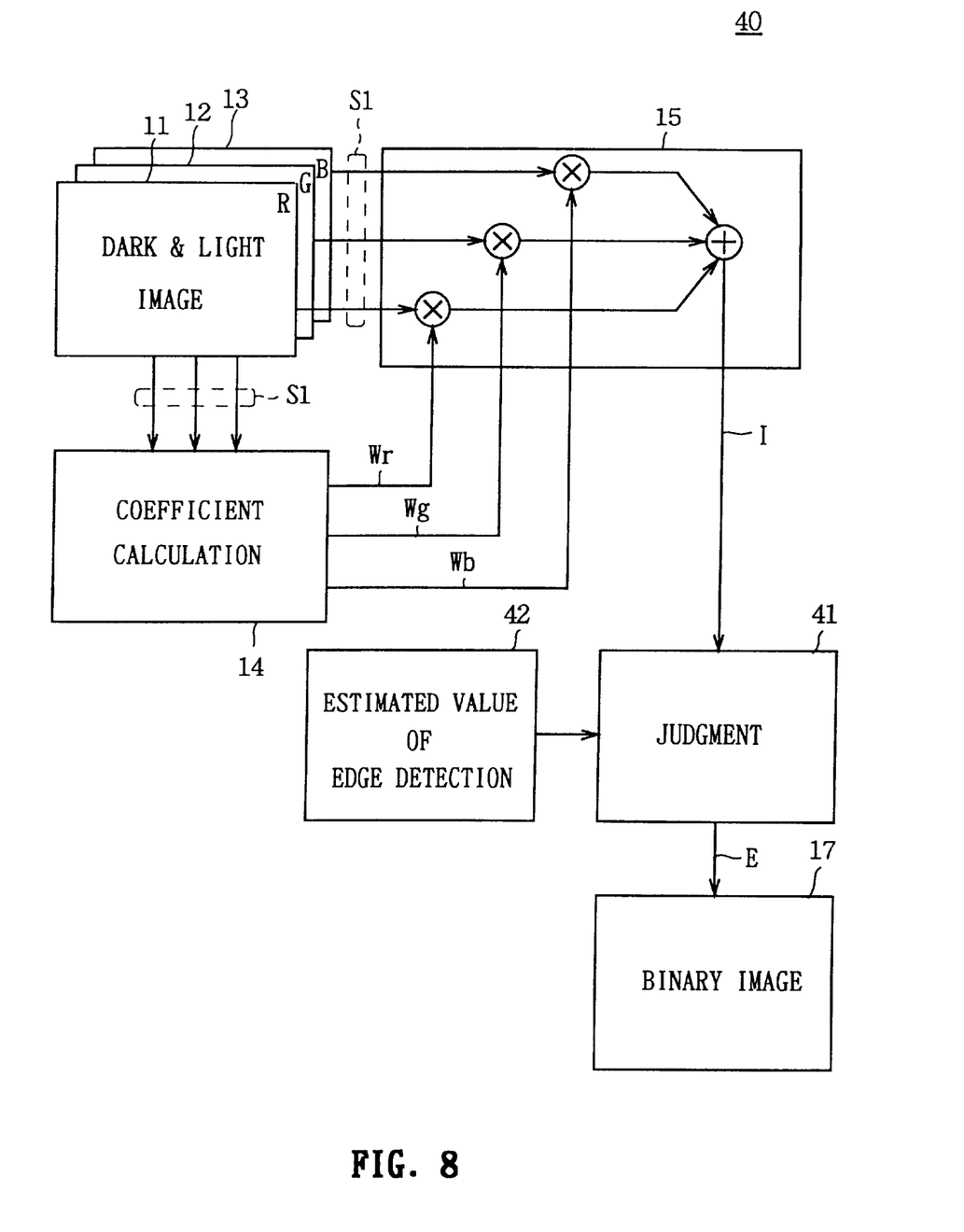
FIG. 8 is a block diagram showing the construction of the second embodiment of the edge detecting device according to the present invention.

The second embodiment is the device which combines the edge detecting method and edge detecting device described above in FIG. 4 and FIG. 5 with the known edge detecting method in order to achieve higher accuracy in further improved detecting method. More specifically, an edge detecting device 40 shown in FIG. 8 in which corresponding parts of FIG. 5 are given the same reference numerals is the device invented in order to cope with the very difficult case where clear edge cannot be detected even utilizing the edge detection device 10 of FIG. 5.

The difference between the edge detecting device 10 of FIG. 5 and this embodiment is that the judging unit 41 judges the edge in utilizing the estimated value 42 in the edge direction in addition to an inner product value S2. The estimated value 42 in the edge direction is made up in advance depending upon the knowledge concerning approximate positions of objects in the image. In the case where the judging unit 41 detects the part on which the inner product value I changes rapidly, it functions in order to detect with priority to the direction change, i.e., the edge, using the estimated value 42 in the edge direction.

Figure 9A:
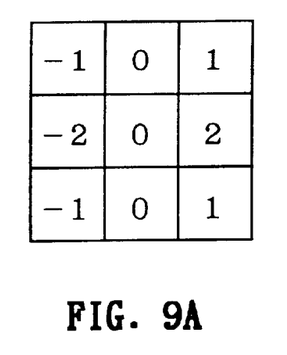
FIGS. 9A and 9B are brief linear diagrams showing the Sobel filter for detecting the edge of special direction being used in the edge detecting device of FIG. 8.
Figure 9B:
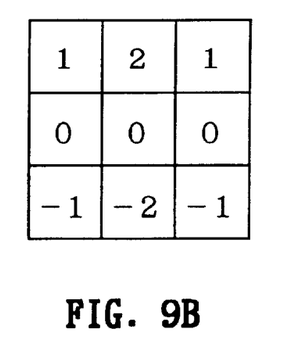

With regard to the edge detecting method which reacts strongly to special direction changes, there is a method to use the Sobel filter as shown in FIGS. 9A and 9B for example. More specifically, when this filter of FIG. 9A is applied to the image, the change in the horizontal direction, i.e., vertical edge, is strongly detected. In the same manner, when the filter of FIG. 9B is applied to the image, the vertical change, i.e., the edge extending horizontally is detected strongly.

Furthermore, there are many other filters known as the compass calculator and the edge in the specific direction can be detected. If it is combined with these known method, edge detection which react sharply to the desired outline, and the outline extraction with higher accuracy can be obtained.

According to the foregoing construction, since the estimated value in the edge direction is obtained utilizing the general edge detecting method and each picture element is judged whether it is edge or not depending on the estimated value in the edge direction, the accuracy in edge detection can be further improved and the outline can be correctly extracted in the general image.

(3) Other Embodiments

Furthermore, the embodiment described above has dealt with the case of detecting edges on the image data composed of darks and light image of three primary colors, i.e., red, green, and blue. However, the image data is not only limited to the above but also it is widely applicable to the case of detecting the edge in the image data composed of multiple dark and light data such as complimentary color line dark and light images.

According to the present invention as described above, since N sets of coefficients corresponding to N numbers of dark and light data respectively are calculated and each picture element is judged whether it is an edge or not in the case of detecting the rapidly changing picture element group as compared with its surroundings au the edge from within image data in which a picture element is composed of N numbers of independent dark and light data, an edge detecting method and edge detecting device capable of improving the edge detection accuracy and capable of extracting the outline in the general image correctly can be realized. With this arrangement, the extraction of the outline of an object by the computer becomes possible even in a state where it was difficult in the past and automation and the operational assistance by the computer in wider range will be possible.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An edge detecting method for detecting a group of picture elements which is changing rapidly as compared with its surroundings as an edge from within an image data in which each picture element is composed of N numbers of independent dark and light data of primary colors, respectively, the group of elements together forming an image made up of pixels, comprising he steps of:
   a weight coefficient generating step for generating N sets of weight coefficients corresponding to said N numbers of dark and light data of each primary color, respectively, the value of each weight coefficient being different for each pixel of the image; and
   a judging step for judging whether said each picture element is an edge or not based on said N numbers of dark and light data of each primary color and said N sets of weight coefficients;
   wherein said N sets of weight coefficients generated at said weight coefficient generating step are N sets of weight coefficients for said N numbers of dark and light data of each primary color, respectively.

2. The edge detecting method according to claim 1, wherein said judging step includes an inner product calculating step for calculating an inner product which is a product sum of said N sets of weight coefficients and said N numbers of dark and light data, and a determining step for determining whether said each picture element is an edge or not based on an output of said inner product calculating step.

3. The edge detecting method according to claim 1, wherein said judging step judges whether said each picture element is an edge or not based on said N sets of weight coefficients and direction information to show that said edge point approximately in a given direction.

4. An edge detecting device for detecting a group of picture elements which is changing rapidly as compared with its surroundings as an edge from within an image data in which the picture element is composed of N numbers of independent dark and light data of each primary color, respectively, the group together forming an image made up of pixels, comprising:
   weight coefficient generating means for generating N sets of weight coefficients corresponding to said N numbers of dark and light data of each primary color, respectively, the value of each weight coefficient being different for each pixel of the image; and
   judging means for judging whether said each picture element is an edge or not in accordance with said N numbers of dark and light data of each primary color and said N sets of weight coefficients;
     wherein said N sets of weight coefficients generated by said weight coefficient generating means are N sets of weight coefficients for said N numbers of dark and light data of each primary color, respectively.

5. The edge detecting device according to claim 4, wherein said judging means comprises means for calculating an inner product which is the product sum of said N sets of weight coefficient and said N numbers of dark and light data, and means for determining whether said each picture element is an edge or not based on the output of said inner product calculating means.

6. The edge detecting device according to claim 4, wherein
   said judging means judges whether said each picture element is an edge or not based on said N sets of weight coefficients and direction information to show that said edge points approximately in a given direction.

7. The method of claim 3 wherein said judging step includes:
   an inner product calculating step for calculating an inner product which is the product sum of said N sets of weight coefficients and said N numbers of dark and light data, and
   a determining step for determining whether said each picture element is an edge or not based on an output of said inner product calculating step.

8. The method of claim 7 wherein the determining step comprises the steps of:
   (a) calculating a rate of change of the inner product in the x and y directions; and
   (b) for all picture elements:
     (i) searching for a direction wherein the rate of change of the inner product value is sudden;
     (ii) calculating the quantity of change in the direction wherein the rate of change of the inner product value is determined to be sudden; and
     (iii) binary coding the result of step (b)(ii) as an edge image E(x,y).

9. The device of claim 6 wherein said judging means comprises
   inner product calculating means for calculating an inner product which is the product sum of said N sets of weight coefficient and said N numbers of dark and light data, and
   determining means for determining whether said each picture element is an edge or not based on the output of said inner product calculating means.

10. The device of claim 9 wherein the determining means comprises:
   (a) means for calculating a rate of change of the inner product in the x and y directions for all picture elements;

(b) means for searching for a direction wherein the rate of change of the inner product value is sudden;

(c) means for calculating the quantity of change in the direction wherein the rate of change of the inner product value is determined to be sudden; and (d) means for binary coding the result of the means for calculating as an edge image E(x,y).

11. An edge detecting method for detecting a group of picture elements which is changing rapidly as compared with its surroundings as an edge from within an image data in which each picture element is composed of N numbers of independent dark and light data of primary colors, respectively, the group of elements together forming an image made up of pixels, comprising the steps of:
   a weight coefficient generating step for generating N sets of weight coefficients corresponding to said N numbers of dark and light data of each primary color, respectively, the value of each weight coefficient being different for each pixel of the image;
   an inner product calculating step for calculating an inner product which is a product sum of said N sets of weight coefficients and said N numbers of dark and light data; and
   a determining step for determining whether said each picture element is an edge or not based on an output of said inner product calculating step;
      wherein said N sets of weight coefficients generated at said weight coefficient generating step are N sets of weight coefficients for said N numbers of dark and light data of each primary color, respectively; and further
      wherein said each picture element is judged to be an edge or not based on said N numbers of dark and light data of each primary color and said N sets of weight coefficients.

12. An edge detecting device for detecting a group of picture elements which is changing rapidly as compared with its surroundings as an edge from within an image data in which the picture element is composed of N number of independent dark and light data of each primary color, respectively, the group together forming an image made up of pixels, comprising:
   weight coefficient generating means for generating N sets of weight coefficients corresponding to said N numbers of dark and light data of each primary color, respectively, the value of each weight coefficient being different for each pixel of the image;
   inner product calculating means for calculating an inner product which is the product sum of said N sets of weight coefficient and said N numbers of dark and light data of each primary color; and
   determining means for determining whether said each picture element is an edge or not based on the output of said inner product calculating means;
      wherein said N sets of weight coefficients generated by said weight coefficient generating means are N sets of weight coefficients for said N numbers of dark and light data of each primary color, respectively; and further
      wherein said each picture element is judged to be an edge or not in accordance with said N numbers of dark and light data of each primary color and said N sets of weight coefficients.

13. An edge detecting method for detecting a group of picture elements which is changing rapidly as compared with its surroundings as an edge from within an image data in which each picture element is composed of N numbers of independent dark and light data of primary colors, respectively, the group of elements together forming an image made up of pixels, comprising the steps of:
   weight coefficient generating step for generating N sets of weight coefficients corresponding to said N numbers of dark and light data of each primary color, respectively;
   inner-product calculating step for calculating a sum of products with each of the sets of weight coefficients and the dark and light data which correspond to each of the sets; and
   determining step for determining whether said each picture element is an edge or not based on an output of said product calculating step;
      wherein said N sets of weight coefficients generated at said weight coefficient generating step are N sets of weight coefficients for said N numbers of dark and light data of each primary color, respectively.

14. The method of claim 13 wherein the value of each weight coefficient differs for each pixel of the image.

15. An edge detecting apparatus for detecting a group of picture elements which is changing rapidly as compared with its surroundings as an edge from within an image data in which each picture element is composed of N numbers of independent dark and light data of primary colors, respectively, the group of elements together forming an image made up of pixels, comprising:
   a weight coefficient generating unit for generating N sets of weight coefficients corresponding to said N numbers of dark and light data of each primary color, respectively;
   an inner-product calculating unit for calculating a sum of products with each of the sets of weight coefficients and the dark and light data which correspond to each of the sets; and
   a determining unit for determining whether said each picture element is an edge or not based on an output of said product calculating unit;
      wherein said N sets of weight coefficients generated by said weight coefficient generating unit are N sets of weight coefficients for said N numbers of dark and light data of each primary color, respectively.

16. The apparatus of claim 15 wherein the value of each weight coefficient differs for each pixel of the image.

17. An edge detecting method for detecting a group of picture elements which changing rapidly as compared with a surroundings as an edge from within an image data in which each picture element is composed of N numbers of independent dark and light data of primary colors, respectively, the group of elements together forming an image made up of pixels, comprising the steps of:
   a weight coefficient generating step for generating N sets of weight coefficients corresponding to said N numbers of dark and light data of each primary color, respectively, the value of each weight coefficient being different for each pixel of the image; and
   a judging step for judging whether said each picture element is an edge or not based on said N numbers of dark and light data of each primary color and said N sets of weight coefficients;
      wherein said N sets of weight coefficients generated at said weight coefficient generating step are N sets of weight coefficients for said N numbers of dark and light data of each primary color, respectively;
      wherein said judging step includes an inner product calculating step for calculating an inner product which is the product sum of said N sets of weight coefficients and said N numbers of dark and light data, and a determining step for determining whether said each picture element is an edge or not based on an output of said inner product calculating step; and wherein the determining step further comprises the steps of:
(a) calculating a rate of change of the inner product in the x and y directions; and
(b) for all picture elements:
(i) searching for a direction wherein the rate of change of the inner product value is sudden;
(ii) calculating the quantity of change in the direction wherein the rate of change of the inner product value is determined to be sudden; and
(iii) binary coding the result of step (b)(ii) as an edge image E(x,y).

18. The edge detecting method of claim 17 wherein said judging step judges whether said each picture element is an edge or not based on said N sets of weight coefficients and direction information to show said edge points approximately in a given direction.

19. An edge detecting method for detecting a group of picture elements changing rapidly as compared with a surroundings as an edge from within an image data in which each picture element is composed of N numbers of independent dark and light data of primary colors, respectively, the group of elements together forming an image made up of pixels, comprising:
a weight coefficient generating step for generating N sets of weight coefficients corresponding to said N numbers of dark and light data of each primary color, respectively, the value of each weight coefficient being different for each pixel of the image;
an inner product calculating step for calculating an inner product which is a product sum of said N sets of weight coefficients and said N numbers of dark and light data; and
a determining step for determining whether said each picture element is an edge or not based on an output of said inner product calculating step;
wherein said N sets of weight coefficients generated at said weight coefficient generating step are N sets of weight coefficients for said N numbers of, dark and light data of each primary color, respectively;
wherein said each picture element is judged to be an edge or not based on said N numbers of dark and light data of each primary color and said N sets of weight coefficients; and
wherein the determining step comprises the steps of:
(a) calculating a rate of change of the inner product in the x and y directions; and
(b) for all picture elements:
(i) searching for a direction wherein the rate of change of the inner product value is sudden;
(ii) calculating the quantity of change in the direction wherein the rate of change of the inner product value is determined to be sudden; and
(iii) binary coding the result of step (b)(ii) as an edge image E(x,y).

20. An edge detecting method for detecting a group of picture elements which is changing rapidly as compared with its surroundings as an edge from within an image data in which each picture element is composed of N numbers of independent dark and light data of primary colors, respectively, the group of elements together forming an image made up of pixels, comprising the steps of:
weight coefficient generating step for generating N sets of weight coefficients corresponding to said N numbers of dark and light data of each primary color, respectively;
inner-product calculating step for calculating a sum of products with each of the sets of weight coefficients and the dark and light data which correspond to each of the sets; and
determining step for determining whether said each picture element is an edge or not based on an output of said product calculating step;
wherein said N sets of weight coefficients generated at said weight coefficient generating step are N sets of weight coefficients for said N numbers of dark and light data of each primary color, respectively; and further
wherein the determining step comprises the steps of:
(a) calculating a rate of change of the inner product in the x and y directions; and
(b) for all picture elements:
(i) searching for a direction wherein the rate of change of the inner product value is sudden;
(ii) calculating the quantity of change in the direction wherein the rate of change of the inner product value is determined to be sudden; and
(iii) binary coding the result of step (b)(ii) as an edge image E(x,y).

21. The method of claim 20 wherein the value of each weight coefficient differs for each pixel of the image.

22. An edge detecting apparatus for detecting a group of picture elements changing rapidly as compared with a surroundings as an edge from within an image data in which each picture element is composed of N numbers of independent dark and light data of primary colors, respectively, the group of elements together forming an image made up of pixels, comprising:
a weight coefficient generating unit for generating N sets of weight coefficients corresponding to said N numbers of dark and light data of each primary color, respectively;
an inner-product calculating unit for calculating a sum of products with each of the sets of weight coefficients and the dark and light data which correspond to each of the sets; and
a determining unit for determining whether said each picture element is an edge or not based on an output of said product calculating unit;
wherein said N sets of weight coefficients generated by said weight coefficient generating unit are N sets of weight coefficients for said N numbers of dark and light data of each primary color, respectively; and further
wherein the determining unit comprises:
(a) a first calculating unit for calculating a rate of change of the inner product in the x and y directions for all picture elements;
(b) a searching unit for searching for a direction wherein the rate of change of the inner product value is sudden;
(c) a second calculating unit for calculating the quantity of change in the direction wherein the rate of change of the inner product value is determined to be sudden; and
(d) a binary coding unit for binary coding the results of the means for calculating as an edge image E(x,y).

23. The apparatus of claim 22 wherein the value of each weight coefficient differs for each pixel of the image.

24. An edge detecting device for detecting a group of picture elements changing rapidly as compared with a surroundings as an edge from within an image data in which the picture element is composed of N numbers of independent dark and light data of each primary color, respectively, the group together forming an image made up of pixels, comprising:

means for generating N sets of weight coefficients corresponding to said N numbers of dark and light data of each primary color, respectively, the value of each weight coefficient being different for each pixel of the image; and means for judging whether said each picture element is an edge or not in accordance with said N numbers of dark and light data of each primary color and said N sets of weight coefficients;

wherein said N sets of weight coefficients generated by said weight coefficient generating means are N sets of weight coefficients for said N numbers of dark and light data of each primary color, respectively;

wherein said judging means comprises means for calculating an inner product which is a product sum of said N sets of weight coefficient and said N numbers of dark and light data, and means for determining whether said each picture element is an edge or not based on the output of said inner product calculating means; and further wherein the determining means comprises:

(a) means for calculating a rate of change of the inner product in the x and y directions for all picture elements;

(b) means for searching for a direction wherein the rate of change of the inner product value is sudden;

(c) means for calculating the quantity of change in the direction wherein the rate of change of the inner product value is determined to be sudden; and (d) means for binary coding the results of the means for calculating as an edge image E(x,y).

25. The device of claim 24 wherein said judging means judges whether said each picture element is an edge or not based on said N sets of weight coefficients and direction information to show said edge points approximately in a given direction.

26. An edge detecting device for detecting a group of picture elements changing rapidly as compared with a surroundings as an edge from within an image data in which the picture element is composed of N numbers of independent dark and light data of each primary color, respectively, the group together forming an image made up of pixels, comprising:

means for generating N sets of weight coefficients corresponding to said N numbers of dark and light data of each primary color, respectively, the value of each weight coefficient being different for each pixel of the image;

means for calculating an inner product which is a product sum of said N sets of weight coefficient and said N numbers of dark and light data of each primary color; and determining means for determining whether said each picture element is an edge or not based on the output of said inner product calculating means;

wherein said N sets of weight coefficients generated by said weight coefficient generating means are N sets of weight coefficients for said N numbers of dark and light data of each primary color, respectively; and further wherein said each picture element is judged to be an edge or not in accordance with said N numbers of dark and light data of each primary color and said N sets of weight coefficients; and further wherein the determining means comprises:

(a) means for calculating a rate of change of the inner product in the x and y directions for all picture elements;

(b) means for searching for a direction wherein the rate of change of the inner product value is sudden;

(c) means for calculating the quantity of change in the direction wherein the rate of change of the inner product value is determined to be sudden; and (d) means for binary coding the results of the means for calculating as an edge image E(x,y).

* * * * *